United States Patent
Guo et al.

(10) Patent No.: US 9,267,409 B2
(45) Date of Patent: Feb. 23, 2016

(54) REVERSE FLOW HYDROCARBON TRAP

(71) Applicant: Ford Global Technologies, LLC, Dearborn, MI (US)

(72) Inventors: Gang Guo, Ann Arbor, MI (US); Giovanni Cavataio, Dearborn, MI (US); Lifeng Xu, Northville, MI (US); Manish Sharma, Inkster, MI (US); Jeffrey Scott Hepburn, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 84 days.

(21) Appl. No.: 14/307,790

(22) Filed: Jun. 18, 2014

(65) Prior Publication Data
US 2015/0369100 A1    Dec. 24, 2015

(51) Int. Cl.
*F01N 3/10*    (2006.01)
*B01D 53/94*    (2006.01)
*F01N 3/20*    (2006.01)
*F02M 25/07*    (2006.01)

(52) U.S. Cl.
CPC .............. *F01N 3/2006* (2013.01); *F01N 3/101* (2013.01); *F02M 25/074* (2013.01)

(58) Field of Classification Search
None
See application file for complete search history.

(56) References Cited

U.S. PATENT DOCUMENTS

| | | | |
|---|---|---|---|
| 6,164,065 A | 12/2000 | Denari et al. | |
| 8,413,433 B2 | 4/2013 | Lupescu | |
| 2004/0001781 A1* | 1/2004 | Kumar | B01J 23/44 422/180 |
| 2010/0205936 A1 | 8/2010 | Suzuki et al. | |
| 2010/0263358 A1 | 10/2010 | Chen et al. | |
| 2010/0313858 A1 | 12/2010 | Springer et al. | |
| 2011/0061371 A1 | 3/2011 | Cavataio et al. | |
| 2012/0117953 A1 | 5/2012 | Andersen et al. | |
| 2012/0137659 A1 | 6/2012 | Uhrich et al. | |
| 2013/0047607 A1 | 2/2013 | Petrovic et al. | |
| 2013/0228145 A1 | 9/2013 | Moyer et al. | |
| 2013/0247544 A1 | 9/2013 | Uhrich et al. | |
| 2013/0287659 A1 | 10/2013 | Lupescu et al. | |

FOREIGN PATENT DOCUMENTS

EP    1099831 A2    5/2001

* cited by examiner

*Primary Examiner* — Walter D Griffin
*Assistant Examiner* — Jelitza Perez
(74) *Attorney, Agent, or Firm* — Damian Porcari; Alleman Hall McCoy Russell & Tuttle LLP

(57) ABSTRACT

A reverse flow hydrocarbon trap is provided that improves the conversion of hydrocarbons present in the exhaust gases of a vehicle to more environmentally benign compounds during cold engine starts. The trap includes a substrate having at least one exhaust gas passage therethrough, with the walls of the exhaust gas passage including a hydrocarbon trapping material and an oxidative catalyst. The substrate includes an inlet for hot exhaust gas from a vehicle engine and an outlet for the exhaust gas and further includes an inlet channel, an outlet channel, and an intermediate channel through which exhaust gas flows. The intermediate channel is oriented such that the flow of exhaust gas through the exhaust gas passage is reversed from the direction of flow in the inlet and outlet channels to improve the performance of the hydrocarbon trap.

20 Claims, 7 Drawing Sheets

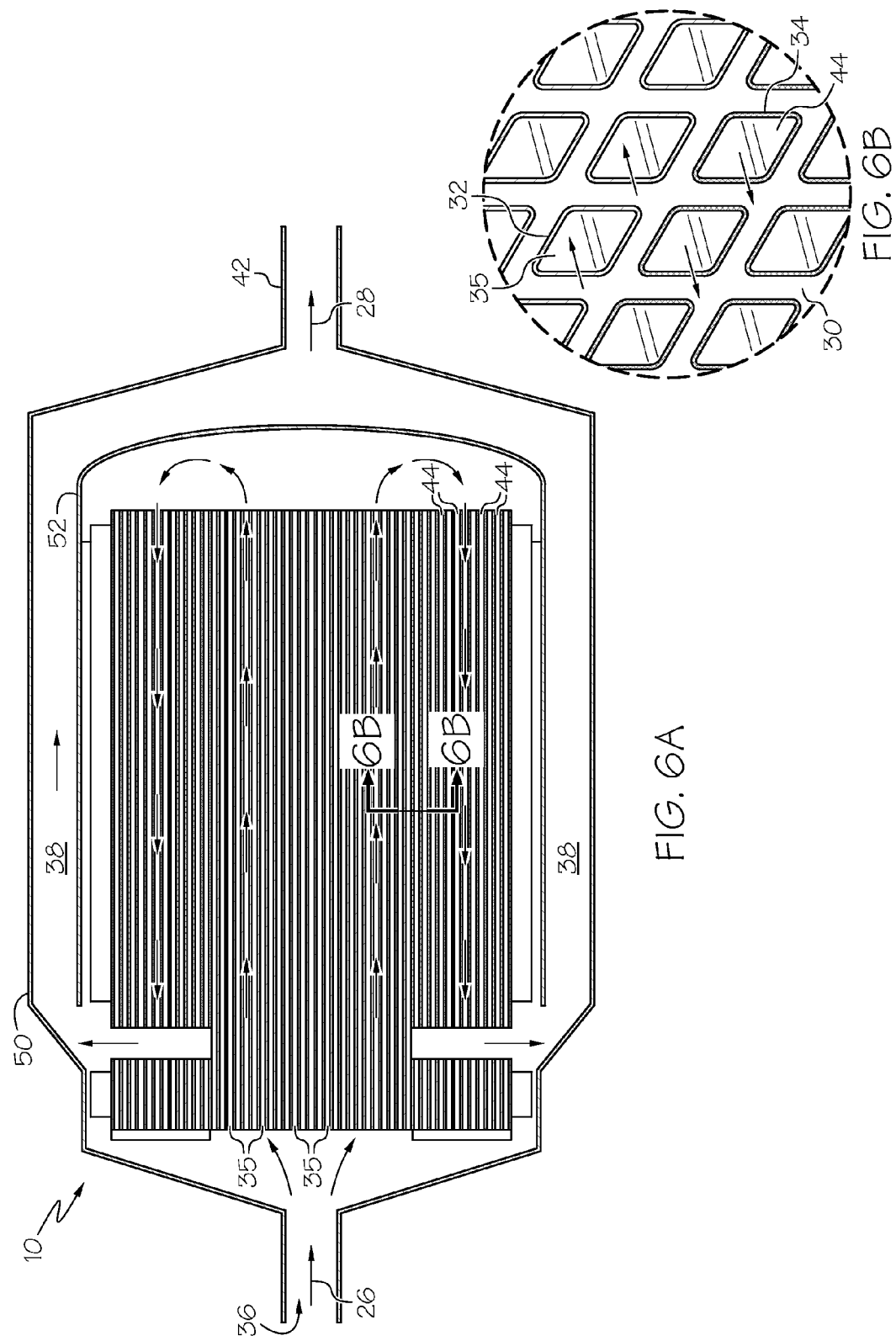

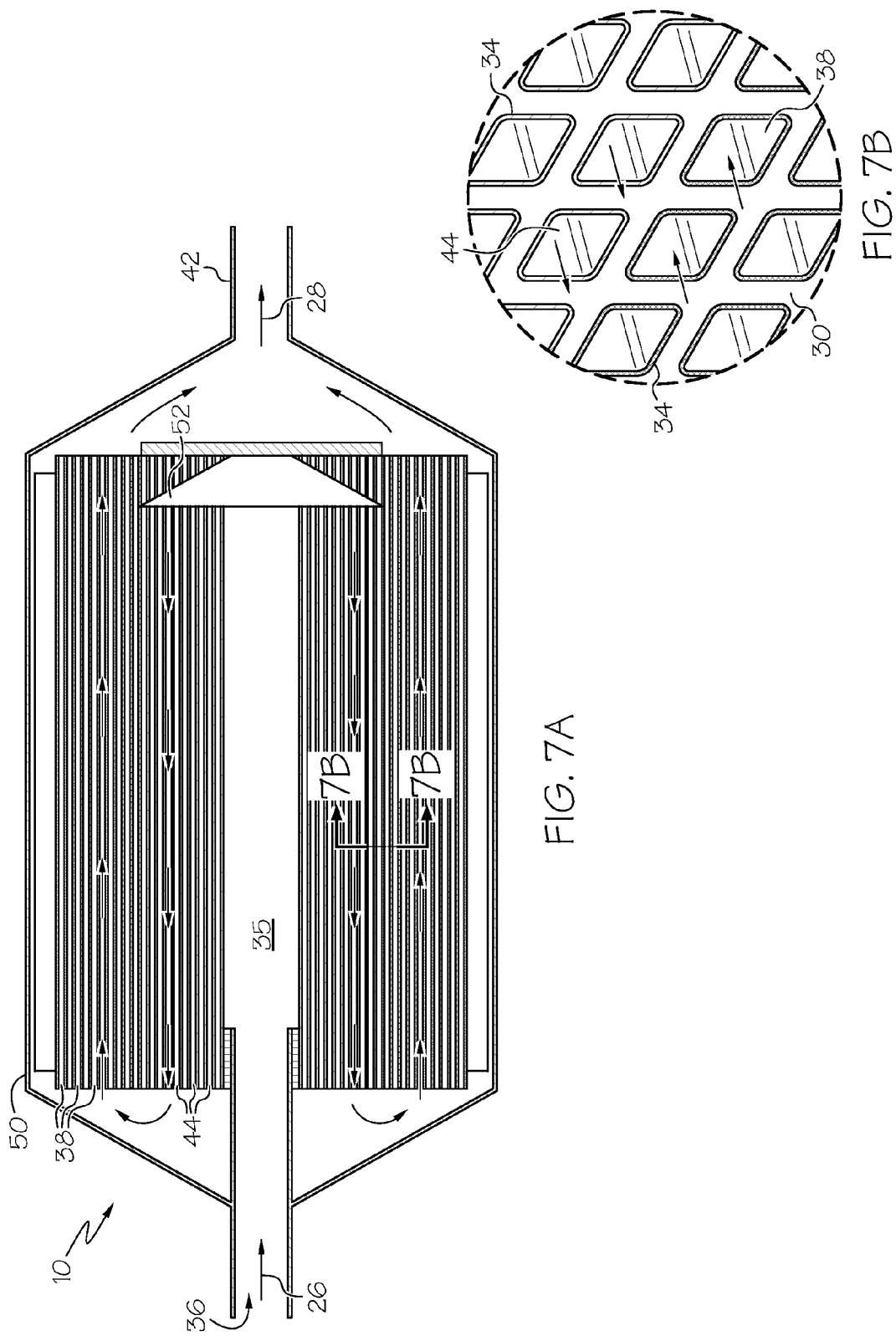

REVERSE FLOW HYDROCARBON TRAP

BACKGROUND

The subject matter described herein relates to hydrocarbon traps used in automotive exhaust systems and to methods of operating such traps to improve their performance in trapping cold start engine emissions.

In recent years, considerable efforts have been made to reduce the level of hydrocarbon (HC) emissions from vehicle engines to meet increasingly stringent emissions standards. Conventional exhaust treatment catalysts such as three-way catalysts (TWC) achieve conversion of hydrocarbons to water and carbon dioxide and help prevent the exit of unburned or partially burned hydrocarbon emissions from a vehicle. Such three-way catalysts are effective to convert over 99% of hydrocarbon emissions in engine exhaust during normal engine operation after warm-up. However, hydrocarbon emissions are high during cold starting of the engine and enter the vehicle's exhaust system before the latent heat of the exhaust gases allows the catalyst to become active, i.e., before the catalyst has reached its "light-off" temperature, defined as the temperature at which the three-way catalyst is effective to convert at least 50% of the unburned hydrocarbon emissions.

Hydrocarbon traps have been developed for reducing emissions during cold-start by trapping/adsorbing hydrocarbon (HC) emissions at low temperatures and releasing/desorbing them from the trap once sufficiently elevated temperatures are reached for oxidation over a catalyst, such as a three-way catalyst. Currently, zeolites are the most widely used adsorption materials for hydrocarbon traps due to their unique cage-like lattice structures. In a conventional hydrocarbon trap design, trapping material such as a zeolite is coated on the walls of, for example, a honeycomb substrate having gas flow passages or channels therethrough. Three-way catalyst is washcoated over the hydrocarbon trap material. As exhaust gases flow through the trap, hydrocarbon emissions are adsorbed by the zeolite material during cold start and are ideally released when the three-way catalyst is warmed to its light-off temperature from the heat in the exhaust gases.

However one major obstacle is that hydrocarbon storage materials such as zeolites normally cannot retain all of the hydrocarbons until the light-off temperature for the three-way catalyst is reached. Typically, on cold starting, more than 50% of the trapped hydrocarbons have already desorbed from the trapping material and have passed through the trap before light-off temperature has been reached. These desorbed hydrocarbons have no chance of being catalytically converted prior to exiting the vehicle exhaust system. In order for a high percentage of hydrocarbons to be converted, the three-way catalyst should be fully active as the hydrocarbons are desorbed from the zeolite trapping materials. This temperature mismatch between a conventional layer configuration design of zeolite and three-way catalyst results in overall poor hydrocarbon trap performance during cold starts.

The art has attempted to improve upon the performance of trapping materials and three-way catalysts with the objective to adsorb more hydrocarbons at low temperatures, delay the release of adsorbed hydrocarbons until higher temperatures are reached, and develop three-way catalysts that have lower light-off temperatures. A further complication is that after the materials in conventional hydrocarbon traps have aged through repeated use, the hydrocarbon trapping materials tend to absorb fewer hydrocarbons and release them at lower temperatures, and the three-way catalysts tend to require higher temperatures to reach light-off.

Accordingly, there remains a need in this art for hydrocarbon traps that are better able to achieve the desired goals of reducing hydrocarbon emissions from vehicle exhaust systems during cold start ups.

BRIEF SUMMARY

Those needs are addressed by embodiments of the present invention which employ a reverse flow design trap so that hydrocarbons which desorb from the trapping material encounter a higher temperature region in the trap before leaving the trap such that the oxidative catalyst is able to convert a greater percentage of hydrocarbon emissions to more environmentally benign compounds.

In accordance with one embodiment of the present invention, a hydrocarbon trap for reducing cold start vehicle emissions is provided and comprises a substrate having at least one exhaust gas passage therethrough. The walls of the exhaust gas passage include at least one hydrocarbon trapping material and at least one oxidative catalyst thereon. The substrate includes an inlet for hot exhaust gas from a vehicle engine and an outlet for the exhaust gas. The exhaust gas passage further includes an inlet channel having first and second ends, with the first end of the inlet channel communicating with the exhaust gas inlet, and an outlet channel having first and second ends, with the second end of the outlet channel communicating with the exhaust gas outlet.

The substrate also includes an intermediate channel having first and second ends, with the first end of the intermediate channel communicating with the second end of the inlet channel and the second end of the intermediate channel communicating with the first end of the outlet channel. The intermediate channel is oriented such that the flow of exhaust gas through the at least one exhaust gas passage is reversed from the direction of flow in the inlet and outlet channels to improve the performance of the hydrocarbon trap.

A feature of the hydrocarbon trap is the ability to rapidly increase the temperature of the inlet end of the trap upon cold start-up. Accordingly, in one embodiment of the invention, the first end of the outlet channel in the trap is adjacent to the hot exhaust gas inlet. In another embodiment, the hydrocarbon trapping material is positioned along the inlet and intermediate channels. In a further embodiment, the oxidation catalyst is positioned along the intermediate channel and outlet channel downstream from the hydrocarbon trapping material.

Using materials having a high thermal conductivity also aid in rapidly increasing the temperature of the trap. The most commonly used substrate in hydrocarbon traps is cordierite which has a thermal conductivity of less than 2 W/(m.K). Other substrate materials including silicon carbide and metals have higher thermal conductivities. In an embodiment of the invention, the inlet end of the substrate comprises a material having a thermal conductivity greater than 2 W/(m.K) Materials of construction which have porosities between about 35% and 70% may also aid in increasing the temperature ramp of the trap. In another embodiment, the inlet end of the substrate has a high thermal mass which also aids in slowing the heating of the substrate and desorption of hydrocarbons.

Other embodiments of the invention may use different hydrocarbon trapping materials arranged to enhance the performance of the trap. For example, in one embodiment, the trap includes at least two different hydrocarbon trapping materials. The positioning of the trapping materials may also enhance the performance of the trap. In another embodiment, a first hydrocarbon trapping material which is adapted to preferentially adsorb water is positioned along the inlet channel. In yet another embodiment, a second hydrocarbon trapping material adapted to preferentially adsorb hydrocarbon molecules having less than 4 carbon atoms such as ethanol, ethylene and propylene, is positioned downstream from the first hydrocarbon trapping material. And, in yet a further embodiment, a third hydrocarbon trapping material which is adapted to preferentially adsorb hydrocarbon molecules having more than 4 carbon atoms such as benzene and toluene, is positioned downstream from the second hydrocarbon trapping material.

In some embodiments, the hydrocarbon trap may be in the form of a substrate having a honeycomb structure.

Accordingly, it is a feature of embodiments of the present invention to improve the performance of a hydrocarbon trap in a vehicle exhaust system during cold start up. It is an additional feature to provide a reverse flow design trap so that hydrocarbons which desorb from the trapping material encounter a higher temperature region in the trap before leaving the trap such that the three-way catalyst is able to convert a greater percentage of hydrocarbon emissions. Other features and advantages of the present invention will be apparent from the following detailed description, the accompanying drawings, and the appended claims.

BRIEF DESCRIPTION OF THE SEVERAL VIEWS OF THE DRAWINGS

The following detailed description of specific embodiments of the present invention can be best understood when read in conjunction with the following drawings, where like structure is indicated with like reference numerals and in which:

FIG. 6A is a schematic side view of one embodiment of the hydrocarbon trap illustrating exhaust gas flow through the honeycomb substrate; FIG. 6B is an enlarged section taken from FIG. 6A;

FIG. 7A is a schematic side view of an alternative embodiment of the hydrocarbon trap illustrating exhaust gas flow through the honeycomb substrate; FIG. 7B is an enlarged section taken from FIG. 7A.

DETAILED DESCRIPTION

Figure 1:
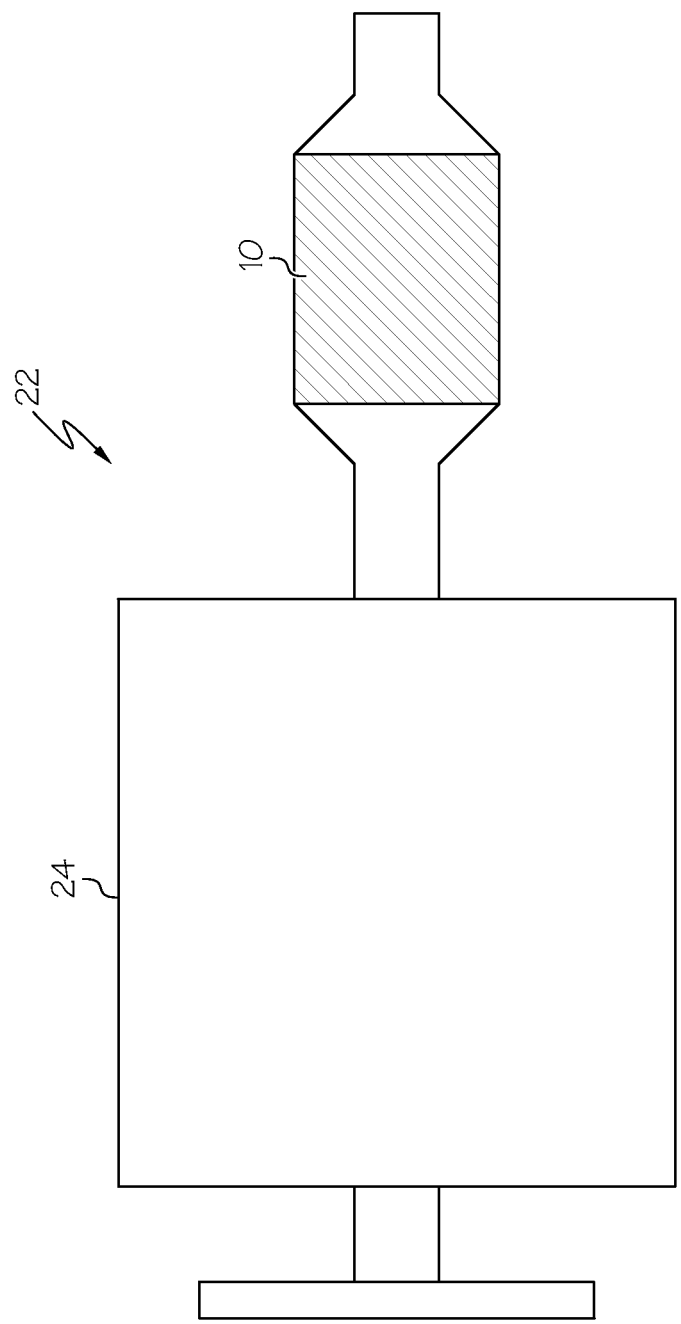
FIG. 1 is a simplified schematic side view of an exhaust gas treatment system that includes a hydrocarbon trap in accordance with one or more embodiments of the present invention.

Referring initially to FIG. 1, a typical automotive exhaust treatment system 22 includes a hydrocarbon trap 10 in an underbody location of a vehicle (not shown). The exhaust gas treatment system is connected to an exhaust manifold 24 of an engine (not shown). The system may include other catalysts and features in addition to the hydrocarbon trap as is conventional in this art.

During cold start operations, as exhaust gases generated by the engine pass through the hydrocarbon trap 10, cold start hydrocarbon emissions such as for example, ethanol, propylene, ethylene, unburned fuel, benzene, and toluene are adsorbed and stored by the hydrocarbon trapping material until the oxidative catalyst in the trap reaches its light off temperature, typically from about 200 to about 300° C. As the temperature in the trap rises, the hydrocarbons are released from the trapping material and are converted by the catalyst to carbon dioxide, water, and other more environmentally benign compounds.

Figure 2A:
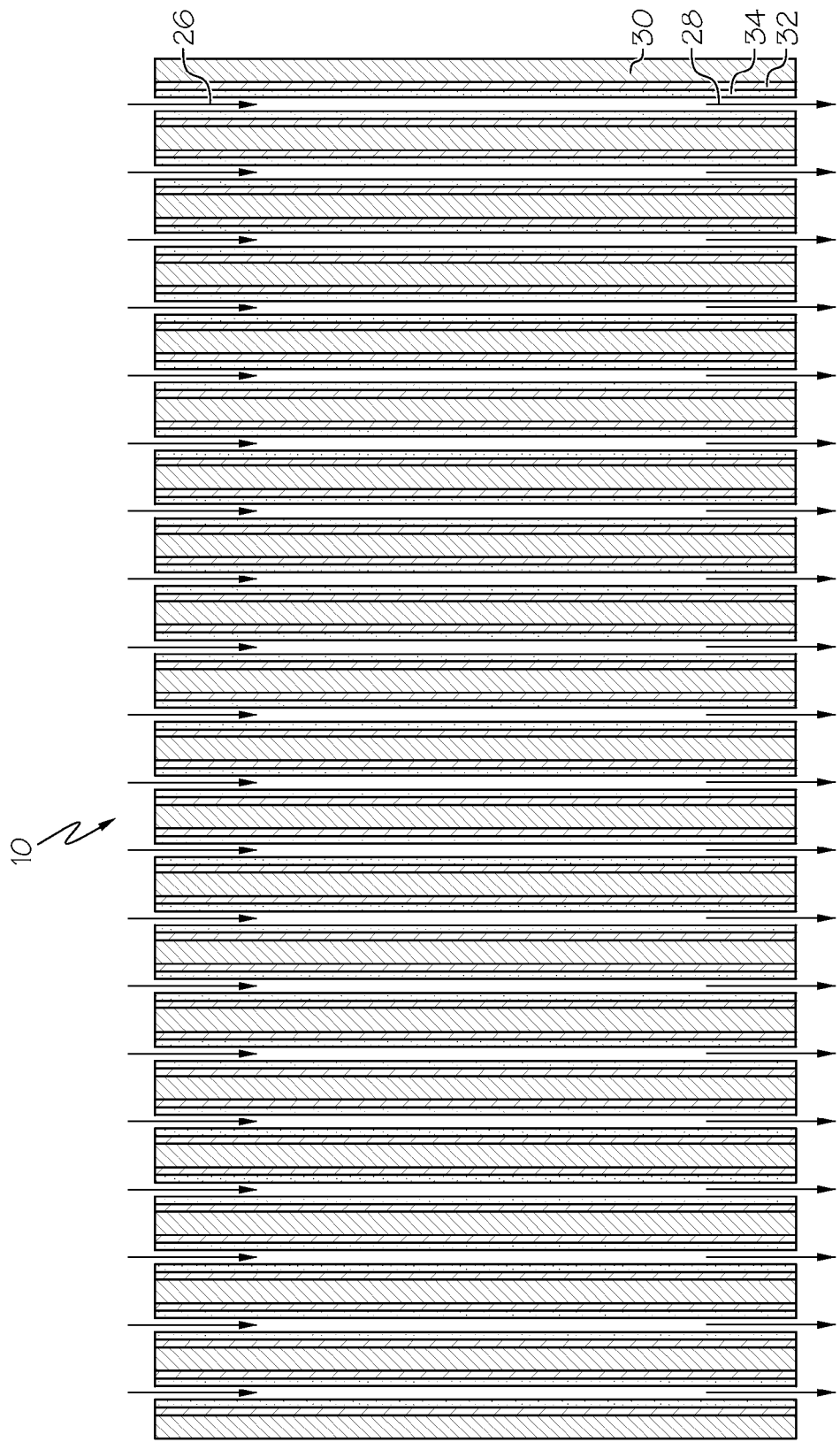
FIG. 2A is a simplified schematic view of the flow of exhaust gases through a conventional hydrocarbon trap.

FIG. 2A illustrates schematically the flow (shown by arrows) of exhaust gases through a conventional flow through hydrocarbon (HC) trap design. As can be seen, hot exhaust gases 26 from the engine enter channels in a honeycomb substrate 30, pass through several gas passages or channels, and exit as treated gases 28 through outlet 37. Hydrocarbon trapping material such as for example a layer of zeolite 32 is on the walls of the gas passages of substrate 30. A three way catalyst (TWC) such as, for example, a platinum-group precious metal-containing catalyst, 34 is over hydrocarbon trapping material 32. Typically, the TWC is applied as a washcoat onto the zeolite coating.

However, one major problem with such conventional HC traps is that hydrocarbons which are adsorbed by the HC trapping/storage materials during cold starts typically are desorbed and released before the temperature of the catalyst has reached its light-off temperature. That is, typically, while the HC trapping material adsorbs hydrocarbons at the relatively low temperatures encountered during cold starts, such hydrocarbons tend to be released from the trapping materials back into the exhaust gas stream as the temperature in the trap rises, but before that temperature has reached the light-off temperature for the three-way catalyst in the trap.

For example, in tests we performed to simulate actual conditions in a typical HC trap using a zeolite trapping material, it was determined that hydrocarbons such as propylene and toluene desorbed from the HC trap material as catalyst outlet temperatures rose from 100 to 500° C. as the trap warmed from exposure to the simulated hot exhaust gas. However, the TWC in the trap did not reach its light-off temperature for either propylene (approx. 375° C.) or toluene (approx. 475° C.) until more than 50% of the trapped HC had already desorbed and had passed through the trap with no chance of being converted. This mismatch between the temperature at which hydrocarbons are desorbed from the HC trapping material and when the TWC has reached its light-off temperature results in an overall poor HC trap performance during cold starts.

Figure 2B:
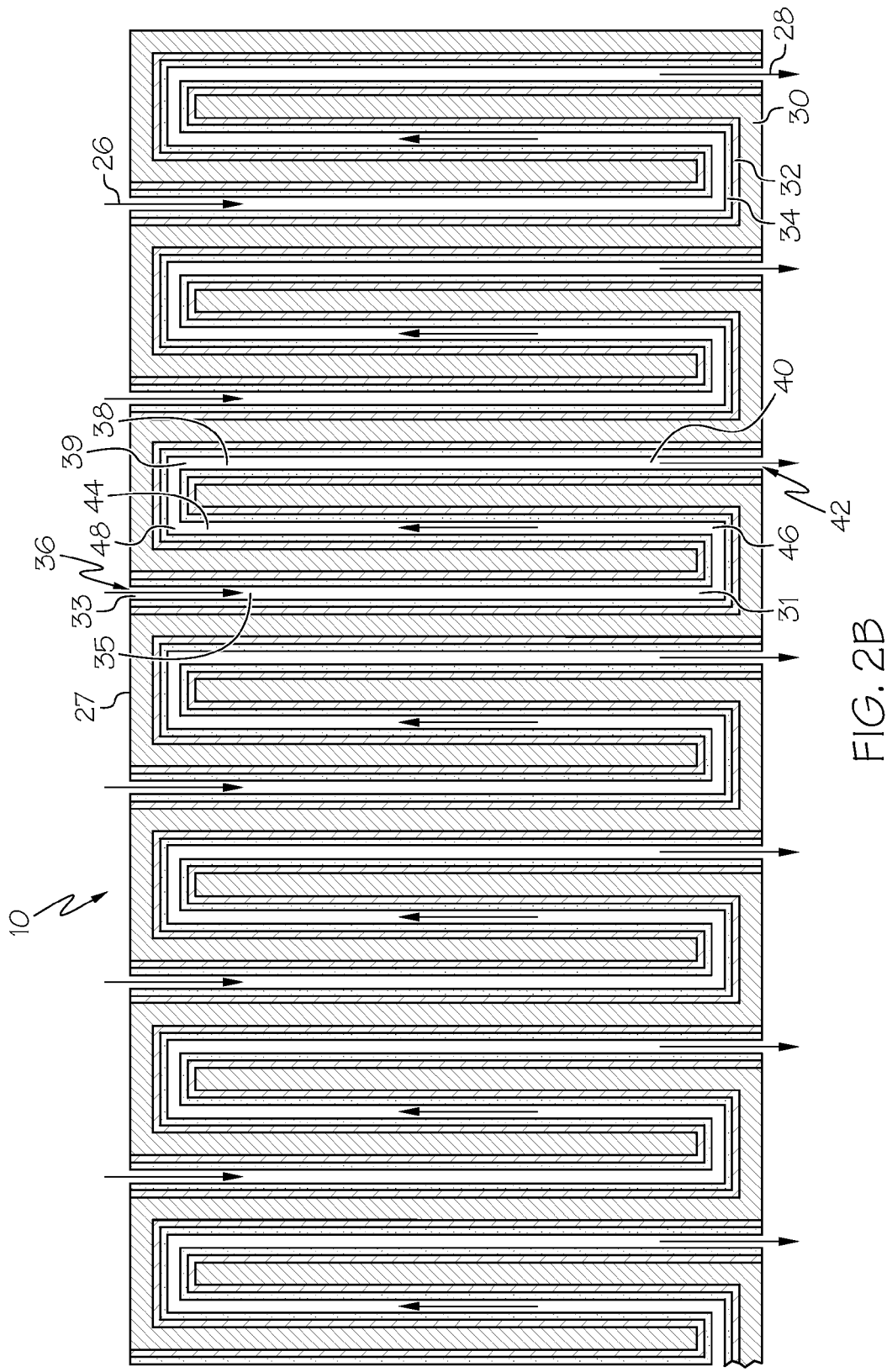
FIG. 2B is a simplified schematic view of an embodiment of the reverse flow hydrocarbon trap of the present invention.

Referring now to FIG. 2B, where like reference numerals represent like elements, one embodiment of the present invention addresses the temperature mismatch problem by providing a reverse flow path through a HC trap. As shown, hot exhaust gases 26 from the engine enter first end 33 of inlet channel 35 through inlet 36. Hydrocarbon trapping material such as for example a layer of zeolite 32 is on the walls of the gas passages in substrate 30. A typical zeolite loading is from about 3 to about 5 g/in³. Inlet channel 35 also includes a second end 31. A three way catalyst (TWC) such as, for example, a platinum-group metal-containing (PGM) catalyst, 34 is over hydrocarbon trapping material 32. Typically, the TWC is applied as a washcoat onto the zeolite coating. A typical loading of PGM catalyst on the hydrocarbon trap is from about 50 to about 100 g/ft$^3$.

Trap 10 also includes a series of outlet channels 38 having first and second ends 39, 40, respectively, with the second end 40 of the outlet channel communicating with exhaust gas outlet 42. Trap 10 also includes a series of intermediate channels 44. Each intermediate channel has respective first and second ends 46, 48. First end 46 of intermediate channel 44 communicates with the second end 31 of inlet channel 35. The second end 48 of intermediate channel 44 communicates with the first end 39 of outlet channel 38.

As shown in FIG. 2B, intermediate channel 44 is oriented such that the flow of hot exhaust gases 26 through the trap is reversed from the direction of exhaust gas flow through the inlet and outlet channels, respectively. In this manner, as hot exhaust gases enter the trap through inlets 36, the exhaust gases are also impinging on the front wall 27 of the trap such that the interior of the trap adjacent the second end 48 of intermediate channel 44 and the first end 39 of the outlet channel 38 is rapidly heated by the heat conducted through the front wall of substrate 30.

Thus, while unburned and partially burned hydrocarbons are initially trapped by trapping material 32 located substantially along the length of inlet channel 35 during cold start up, as those hydrocarbons are desorbed as the exhaust gases heat the inlet channel, those hydrocarbons must traverse the length of the inlet channel 35 and intermediate channel 44 before they encounter the oxidative TWC catalyst 34 on the walls located at the second end 48 of intermediate channel 44. At this point, however, that portion of the trap has been heated (via heat conduction through front wall 27) to a temperature sufficient to activate the oxidative catalyst and convert (oxidize) the hydrocarbons in the exhaust gas stream. Further oxidation takes place substantially along the length of outlet channel 38 before the exhaust gas stream exits the trap, resulting in improved trap performance.

Figure 3:
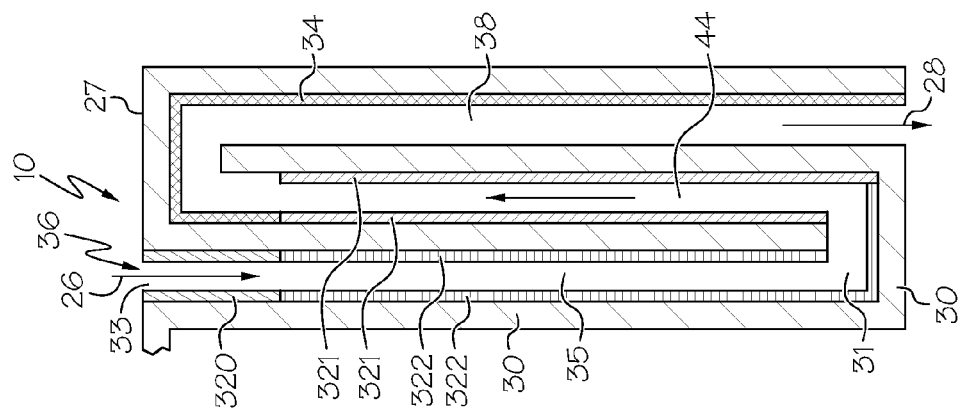
FIG. 3 is a simplified schematic side view of an alternate embodiment illustrating the location of different hydrocarbon trapping materials on the interior walls of the trap.

Referring now to FIG. 3, where like elements are represented by like reference numerals, another embodiment of the invention is illustrated. In this embodiment, different hydrocarbon trapping materials are utilized in sequence to improve the absorbance of hydrocarbons in the trap and to retain those hydrocarbons until higher temperatures are reached in the trap. As shown, hot exhaust gases 26 from the engine enter first end 33 of inlet channel 35 through inlet 36. Different hydrocarbon trapping materials are positioned substantially along the length of inlet channel 35. For example, the first section 320 of inlet channel 35 is coated with a hydrophilic zeolite material such as BEA25 to adsorb water contained in the exhaust gas so that any adverse effects of water on downstream zeolites are minimized. Hydrophilic zeolite is followed in inlet channel 35 by a second zeolite 322 designed to trap and store larger hydrocarbon molecules such as benzene, toluene, and other aromatic hydrocarbons. The second zeolite is coated substantially along the remaining length of the inlet channel.

A third hydrocarbon trapping material 321 such as, for example, copper chabazite (Cu/CHA) or metal added BETA zeolite, is positioned substantially along the length of intermediate channel 44 to adsorb and store smaller hydrocarbon molecules such as ethanol and propylene. Oxidative catalyst 34 is positioned as shown along the transition between the intermediate and outlet channels and substantially along the length of the outlet channel 38. By positioning the oxidative catalyst downstream from the hydrocarbon trapping materials, the catalyst has an opportunity to become heated to its activation/light-off temperature to oxidize hydrocarbons as they are released from the upstream trapping materials. As will be apparent to those skilled in this art, the types, loadings, surface area, and sequences of trapping materials and oxidative catalyst may be varied.

The embodiment illustrated in FIG. 3 has several advantages which improve the overall performance of the trap during cold start up. Unlike conventional HC traps, the oxidative catalyst is not washcoated over the hydrocarbon trapping material. This improves hydrocarbon trapping as there is no diffusion resistance from an overcoat of oxidative catalyst. Further, the loading of the trapping material can be maximized as there is no second coating layer. Additionally, the amount of expensive oxidative catalyst (such as, for example, platinum-group metals) is reduced as it is present only in the outlet channels of the trap. Finally, because the hydrocarbon trapping materials and oxidative catalyst are separately located, any potential adverse effects from the interaction between the two is eliminated.

Figure 4:
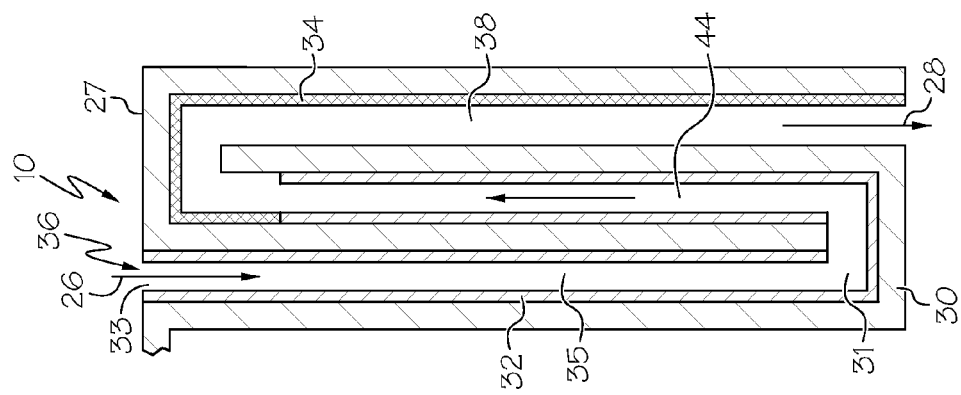
FIG. 4 is a simplified schematic side view of another embodiment illustrating the location of the hydrocarbon trapping material and TWC catalyst on the interior walls of the trap.

FIG. 4 illustrates another embodiment of the invention where like elements are represented by like reference numerals. As shown, hot exhaust gases 26 from the engine enter first end 33 of inlet channel 35 through inlet 36. Hydrocarbon trapping material 32 is positioned substantially along the length of inlet channel 35 and intermediate channel 44. Oxidative catalyst 34 is positioned downstream from the hydrocarbon trapping material substantially along the length of outlet channel 38. As will be apparent to those skilled in the art, the surface areas and loadings of each of the hydrocarbon trapping material and oxidative catalyst may be varied. That is, the respective percentages that each material makes up of the total path length through the trap may vary widely depending on the particular circumstances and needs of the exhaust gas treatment system.

By positioning the trapping material and oxidative catalyst sequentially in this manner, the hydrocarbon retention time in the trap is increased. This, in turn, gives the oxidative catalyst more time to be heated to its activation/light-off temperature, improving trap performance. Additionally, by positioning the materials sequentially, rather than as a dual layer as in conventional trap designs, any potential adverse effects from the interaction between the trapping material and oxidative catalyst are avoided.

Figure 5:
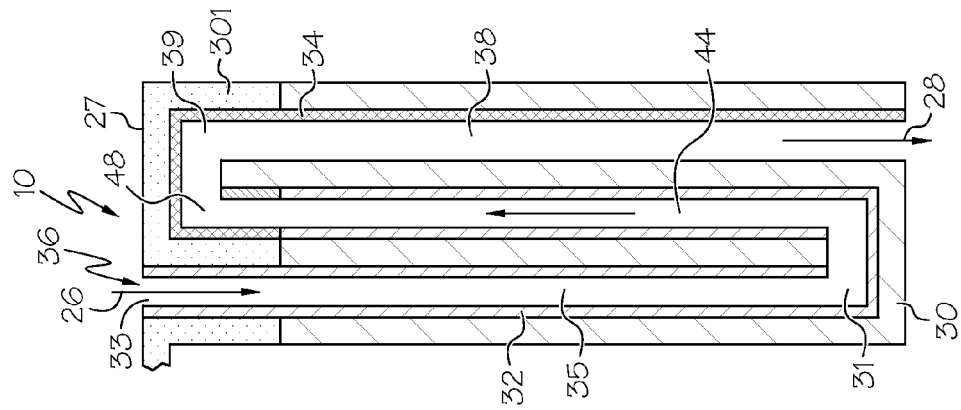
FIG. 5 is a simplified schematic side view of another embodiment of the present invention illustrating the location of high thermal conductivity and high thermal mass materials forming the hydrocarbon trap substrate.

FIG. 5 illustrates yet another embodiment of the invention. In this embodiment, where like elements are represented by like reference numerals, a high thermal conductivity material is used for at least a portion of the substrate. By positioning a high thermal conductivity adjacent to the front wall 27 of the trap, that portion of the trap will be heated more rapidly due to the greater heat transfer through the substrate material to improve overall trap performance during cold start up. As shown, hot exhaust gases 26 from the engine impinge on front wall 27 and enter first end 33 of inlet channel 35 through inlet 36. Any unburned or partially burned hydrocarbons encounter HC trapping material 32 which is coated substantially along the length of the inlet channel 35 and intermediate channel 44. Hydrocarbons are adsorbed by trapping material 32 where they are stored/retained as the trap is gradually heated by the hot exhaust gases.

At the same time, high thermal conductivity material 27 transfers heat to the second end 48 of the intermediate channel and the first end 39 of the outlet channel. As trap 10 is heated and trapped hydrocarbons are released by the trapping material, they re-enter the exhaust gas stream and are oxidized by oxidative catalyst 34 which is coated onto the walls of outlet channel 38. By "high thermal conductivity material," we mean a material having a thermal conductivity value greater than that of cordierite, namely, at least above about 2 W/(m.k). Suitable high thermal conductivity materials for substrate 301 include silicon carbide (20-60 W/(m.K)) and metallic substrates including composites of aluminum, iron, and other metals having thermal conductivities in the range of from about 100-150 W/(m.K), as opposed to other ceramics having much lower thermal conductivities such as cordierite (2 W/(m.K)). We have found that lower porosity materials also have higher thermal conductivities.

To further improve overall trap performance, substrate 30 is fabricated from a high thermal mass (thermal diffusivity) material such as, for example, cordierite with a porosity of less than about 35%, silicon carbide, and metal substrates. Materials having high thermal mass (heat capacity) values slow the warm up of the substrate and hence the washcoat. Use of a high thermal mass material delays heating of the inlet and intermediate channels in the reverse flow trap, resulting in longer retention times for hydrocarbons which are trapped by trapping materials 32. By extending the time that such hydrocarbons are retained/stored, when the hydrocarbons are released, the oxidative catalyst has a longer time in which to be heated to its light-off temperature, thus improving hydrocarbon conversion in the trap.

In some embodiments, substrate 30 is fabricated in the form of a honeycomb contained within an outer shell 50. FIGS. 6A and 6B illustrate one possible flow pattern for a reverse flow hydrocarbon trap using a honeycomb substrate. As shown in FIGS. 6A and 6B, exhaust gases 26 enter trap 10 through inlet 36 and are directed to inlet channels 35 located in the interior core of the honeycomb. The exhaust gases flow through the inlet channels and exit the honeycomb at the opposite end of the trap. The gases are then directed, by a suitable structure such as, for example, cowl 52 to flow through intermediate channels 44 in the reverse direction. As shown, intermediate channels 44 are located around the exterior of the honeycomb. After flowing through intermediate channels 44, the exhaust gases are directed thorough outlet channels 38 and exit the trap at outlet 42.

In this embodiment, the positioning of the trapping materials and oxidative catalysts along the walls of the inlet and intermediate channels may be in any of the configurations previously described. Typically, hydrocarbon trapping material 32 would be positioned on the walls of the inlet channels 35, while oxidative catalyst 34 would be positioned along the walls of intermediate channels 44. In this manner, heat from the hot exhaust gases flowing through the inlet channels would be conducted outwardly through the walls of honeycomb substrate 30 to the intermediate channels. Again, by designing the exhaust gas flow to increase the retention time of the hydrocarbons in the trap, and to delay their release until the temperature of the oxidative catalyst has risen to its light-off temperature, overall trap performance is improved.

FIGS. 7A and 7B illustrate another embodiment in which the flow pattern of the exhaust gases is modified from that shown in the previous embodiment, but which still utilizes a reverse flow pattern to improve trap performance. As shown in FIGS. 7A and 7B, exhaust gases 26 enter trap 10 through inlet 36 and are directed to a centrally-positioned inlet channel 35 located in the interior core of the honeycomb. The exhaust gases flow through the inlet channel and exit the honeycomb at the opposite end of the trap. The gases are then directed, by a suitable structure such as, for example, cowl 52 to flow through intermediate channels 44 in the reverse direction. As shown, intermediate channels 44 are located around the interior core of the honeycomb. After flowing through intermediate channels 44, the exhaust gases are directed to outlet channels 38 and exit the trap at outlet 42.

In this embodiment, the positioning of the trapping materials 32 and oxidative catalysts 34 along the walls of the intermediate and outlet channels may be in any of the configurations previously described. Typically, hydrocarbon trapping material 32 would be positioned on the walls of the intermediate channels 44, while oxidative catalyst 34 would be positioned along the walls of outlet channels 38. In this manner, heat from the hot exhaust gases flowing through central inlet channel 35 and intermediate channels 44 would be conducted outwardly through the walls of honeycomb substrate 30 to the outlet channels. Again, by designing the exhaust gas flow to increase the retention time of the hydrocarbons in the trap, and to delay their release until the temperature of the oxidative catalyst has risen to its light-off temperature, overall trap performance is improved.

In order that the invention may be more readily understood, reference is made to the following example which is intended to illustrate embodiments of the invention, but not limit the scope thereof.

EXAMPLE

An experiment was conducted to compare the performance of a conventionally designed HC trap with an embodiment of the reverse flow trap design of the present invention. Two HC trap catalyst samples (1 inch diameter and 1 inch long; honeycomb construction) were used to simulate different designs, and both were commercial HC trap catalysts with zeolite coated at the bottom layer and a TWC catalyst coated on the zeolite layer. One sample was modified to have a stack of 3 rows of 8 gas channels for a total of 24 straight through channels open; all other gas channels in the honeycomb sample were blocked.

Another sample (also 1 inch diameter and 1 inch long; honeycomb construction) was modified so that a first row of 8 channels were gas inlet channels, another row of 8 channels were intermediate, reverse flow channels, and 8 were outlet channels. The total catalyst area on the walls of the gas passages, as well as the volume exposed to HC, were the same for both samples. A simulated exhaust gas containing a blend of propylene, iso-pentane, and toluene was flowed through both samples. The hydrocarbons were absorbed for 30 seconds at room temperature, followed by desorption as the temperature in the samples was ramped up. Both samples were pretreated with oxygen at high temperature to store some oxygen in the trap catalyst so that the hydrocarbons in the simulated exhaust gas could be partially converted during the ramp up in temperature.

Figure 8B:
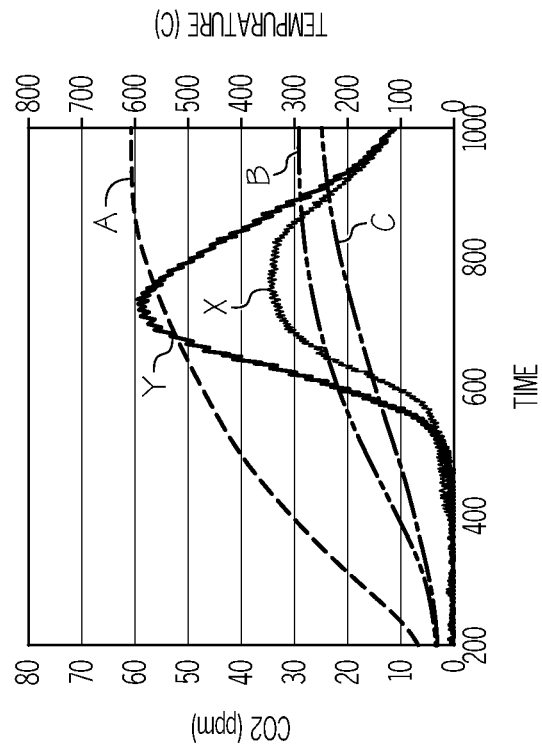
FIGS. 8A and 8B are charts of time (sec) and temperature (° C.) comparing carbon dioxide and carbon monoxide generation (ppm) using conventional flow versus the reverse flow design of an embodiment of the present invention.
Figure 8A:
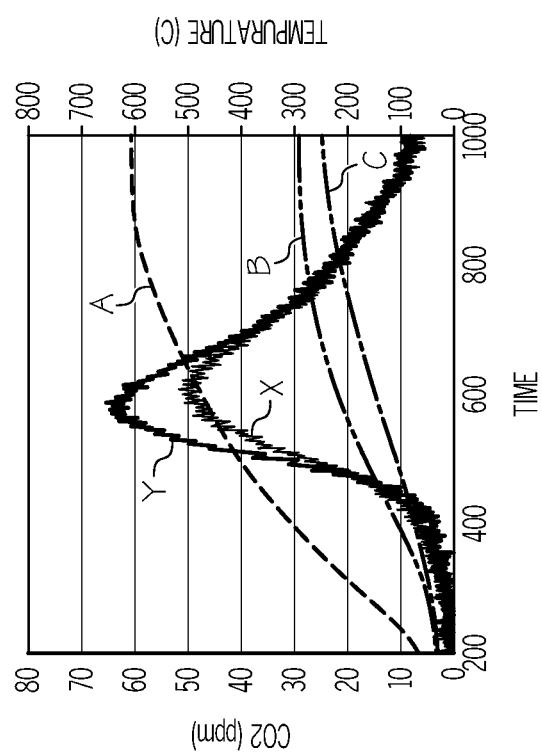

The results are shown in FIGS. 8A and 8B. FIG. 8A compares the $CO_2$ generation and FIG. 8B compares the CO generation as the temperature of the catalysts in the two samples was ramped up from room temperature to approximately 600° C. Curve A is the temperature of the catalyst at the inlet to the samples, Curve B is the temperature measured at the outlet to the conventional flow design sample, and Curve C is the temperature measured at the outlet to the reverse flow design sample. Curve X is the measured $CO_2$ (FIG. 8A) and CO (FIG. 8B) over time (t=0 to 1000 sec) for the conventional flow design sample, and Curve Y is the measured $CO_2$ (FIG. 8A) and CO (FIG. 8B) over the same time frame for the reverse flow design sample.

As can be seen, the reverse flow channel design sample produced more CO and $CO_2$ than conventional design sample with straight flow channels. CO and $CO_2$ production is a measure of the amount of hydrocarbons which were oxidized by the catalyst on the sample walls. By integrating the CO and $CO_2$ generation before catalyst inlet temperature reached 600° C., the sample with the reverse flow design produced 12% more $CO_2$ and 54% more CO than the sample with regular flow design. This demonstrates that the reverse flow design sample was more efficient in converting the hydrocarbons in the simulated exhaust gas stream than the conventional straight flow design. Also, the outlet temperature of the reverse flow sample was much lower than the outlet temperature of conventional straight flow design sample.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention. Unless otherwise indicated, the disclosure of any ranges in the specification and claims are to be understood as including the range itself and also anything subsumed therein, as well as endpoints.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A hydrocarbon trap for reducing cold start vehicle emissions comprising:
    a substrate having at least one exhaust gas passage therethrough, the walls of said exhaust gas passage including a hydrocarbon trapping material and an oxidative catalyst thereon;
    said substrate including an inlet for hot exhaust gas from a vehicle engine and an outlet for said exhaust gas;
    said exhaust gas passage further including an inlet channel having first and second ends, said first end of said inlet channel communicating with said exhaust gas inlet, an outlet channel having first and second ends, said second end of said outlet channel communicating with said exhaust gas outlet, and
    an intermediate channel having first and second ends, said first end of said intermediate channel communicating with said second end of said inlet channel and said second end of said intermediate channel communicating with said first end of said outlet channel, wherein said intermediate channel is oriented such that the flow of exhaust gas through said at least one exhaust gas passage is reversed from the direction of flow in said inlet and outlet channels.

2. The hydrocarbon trap as claimed in claim 1 wherein said first end of said outlet channel is adjacent to said hot exhaust gas inlet.

3. The hydrocarbon trap as claimed in claim 1 wherein said hydrocarbon trapping material is positioned along said inlet and said intermediate channels.

4. The hydrocarbon trap as claimed in claim 1 wherein said oxidative catalyst is positioned along said intermediate channel and said outlet channel.

5. The hydrocarbon trap as claimed in claim 1 wherein the inlet end of said substrate comprises a material having a thermal conductivity of greater than about 3 W/m-k.

6. The hydrocarbon trap as claimed in claim 5 in which the inlet end of said substrate has a porosity between about 35% and about 70%.

7. The hydrocarbon trap as claimed in claim 5 wherein said inlet end of said substrate comprises a material including one or more of silicon carbide, metallic or cordierite.

8. The hydrocarbon trap as claimed in claim 1 wherein the outlet end of said substrate comprises a material having a higher thermal mass to slow down the release of HCs from said hydrocarbon trapping material.

9. The hydrocarbon trap as claimed in claim 1 including at least two different hydrocarbon trapping materials.

10. The hydrocarbon trap as claimed in claim 9 including a first hydrocarbon trapping material adapted to preferentially adsorb water positioned along said inlet channel.

11. The hydrocarbon trap as claimed in claim 10 including a second hydrocarbon trapping material adapted to preferentially adsorb hydrocarbon molecules having less than 4 carbon atoms positioned downstream from said first hydrocarbon trapping material.

12. The hydrocarbon trap as claimed in claim 11 including a third hydrocarbon trapping material adapted to preferentially adsorb hydrocarbon molecules having more than 4 carbon atoms positioned downstream from said second hydrocarbon trapping material.

13. The hydrocarbon trap as claimed in claim 1 in which said substrate comprises a honeycomb structure contained within a sealed vessel.

14. The hydrocarbon trap as claimed in claim 13 including multiple inlet channels positioned in an interior core of said honeycomb structure.

15. The hydrocarbon trap as claimed in claim 13 including multiple intermediate channels positioned around the exterior of said honeycomb structure.

16. The hydrocarbon trap of claim 13 including a structure to direct the flow of said exhaust gas from said second end of said inlet channels to said first end of said intermediate channels.

17. The hydrocarbon trap as claimed in claim 13 in which said inlet channel is positioned in an interior core of said honeycomb structure.

18. The hydrocarbon trap as claimed in claim 17 including multiple intermediate channels positioned around said inlet channel.

19. The hydrocarbon trap as claimed in claim 18 including multiple outlet channels positioned around an exterior core of said honeycomb structure.

20. A hydrocarbon trap as claimed in claim 19 including a structure to direct the flow of said exhaust gas from the outlet end of said inlet channel into said multiple intermediate channels.

* * * * *